United States Patent

Caveney et al.

[11] Patent Number: 5,146,654
[45] Date of Patent: Sep. 15, 1992

[54] STRETCHED CABLE TIE

[75] Inventors: Jack E. Caveney, Hinsdale; James A. Brownlee, Park Forest; Jeffery S. Kuzmuk, Tinley Park, all of Ill.

[73] Assignee: Panduit Corp., Tinley Park, Ill.

[21] Appl. No.: 695,153

[22] Filed: May 3, 1991

[51] Int. Cl.5 ............................................. B65D 63/00
[52] U.S. Cl. .................. 24/16 PB; 24/17 AP; 24/20 TT
[58] Field of Search ........... 24/16 PB, 17 AP, 30.5 P, 24/20 TT; 248/74.3; 292/317

[56] References Cited

U.S. PATENT DOCUMENTS

| | | |
|---|---|---|
| 3,766,608 | 10/1973 | Fay . |
| 3,887,965 | 6/1975 | Schuplin .......................... 24/16 PB |
| 3,983,603 | 10/1976 | Joyce . |
| 3,991,444 | 11/1976 | Bailey ............................... 24/16 PB |
| 3,996,646 | 12/1976 | Caveney . |
| 4,003,106 | 1/1977 | Schumacher et al. ............ 24/16 PB |
| 4,135,749 | 1/1979 | Caveney et al. .................. 24/16 PB |
| 4,136,148 | 1/1979 | Joyce . |
| 4,473,524 | 9/1984 | Paradis . |
| 4,573,242 | 3/1986 | Lankton et al. ................... 24/16 PB |
| 4,580,319 | 4/1986 | Paradis . |
| 4,754,529 | 7/1988 | Paradis . |
| 4,788,751 | 12/1988 | Shely et al. ........................ 24/16 PB |
| 4,788,752 | 12/1988 | Kraus et al. ....................... 24/16 PB |
| 4,866,816 | 9/1989 | Caveney . |

Primary Examiner—Victor N. Sakran
Attorney, Agent, or Firm—Charles R. Wentzel; Mark D. Hilliard

[57] ABSTRACT

A stretched cable tie has a head connected to a strap having teeth on both sides of the strap. A moveable pawl is positioned on a ledge inside the head and urges the strap into engagement with a fixed tooth within the head so that teeth on both sides of the strap are engaged by the pawl and fixed tooth respectively. A sharp corner is provided more than a multiple of the spacing between the strap teeth below the fixed tooth so as to allow the corner to penetrate the strap and engage the adjacent tooth to aid in providing a withdrawal force. A portion of the wall of the head behind the fixed tooth is removed to facilitate cooling and eliminate shrinkage in the area of the fixed tooth.

23 Claims, 5 Drawing Sheets

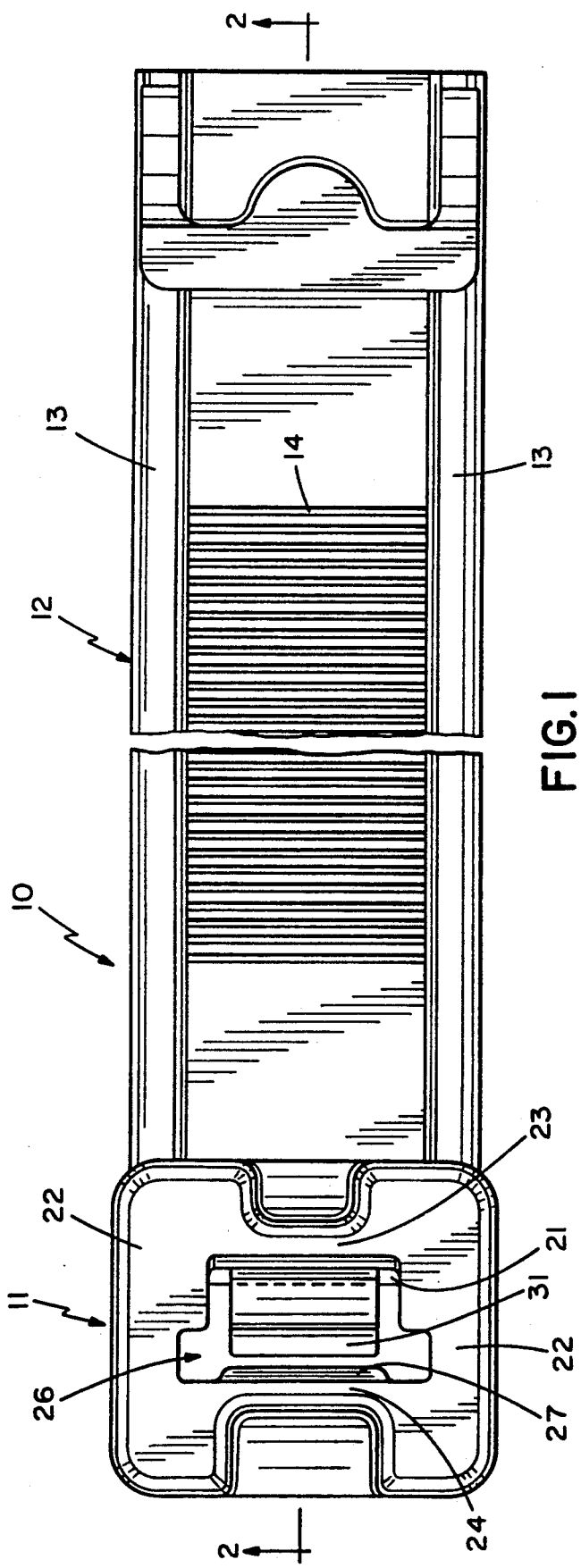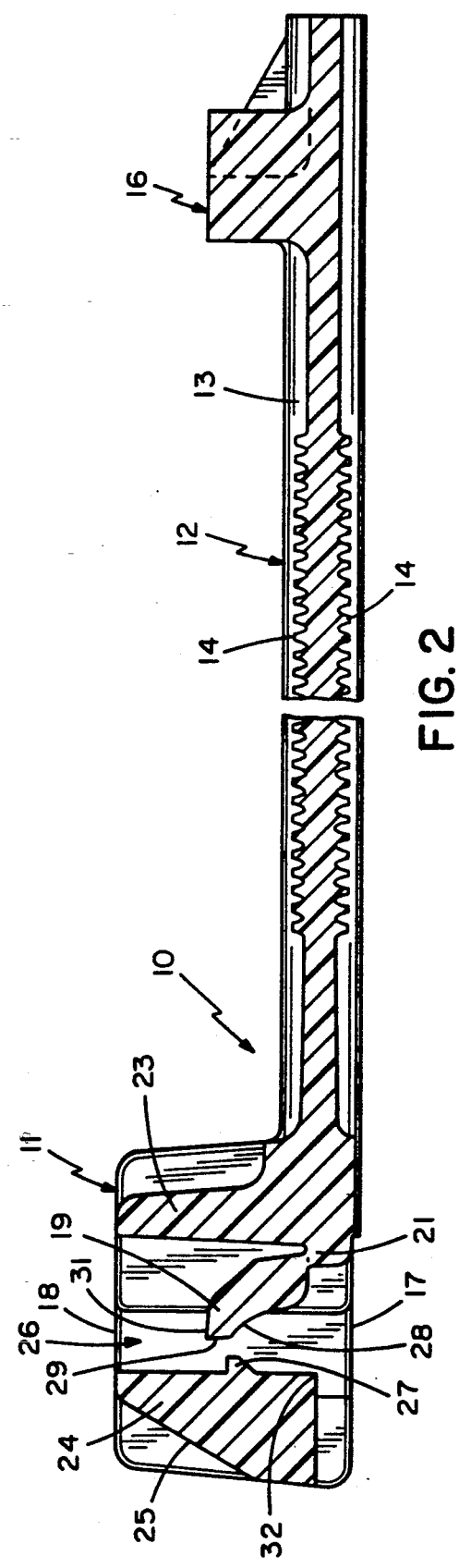

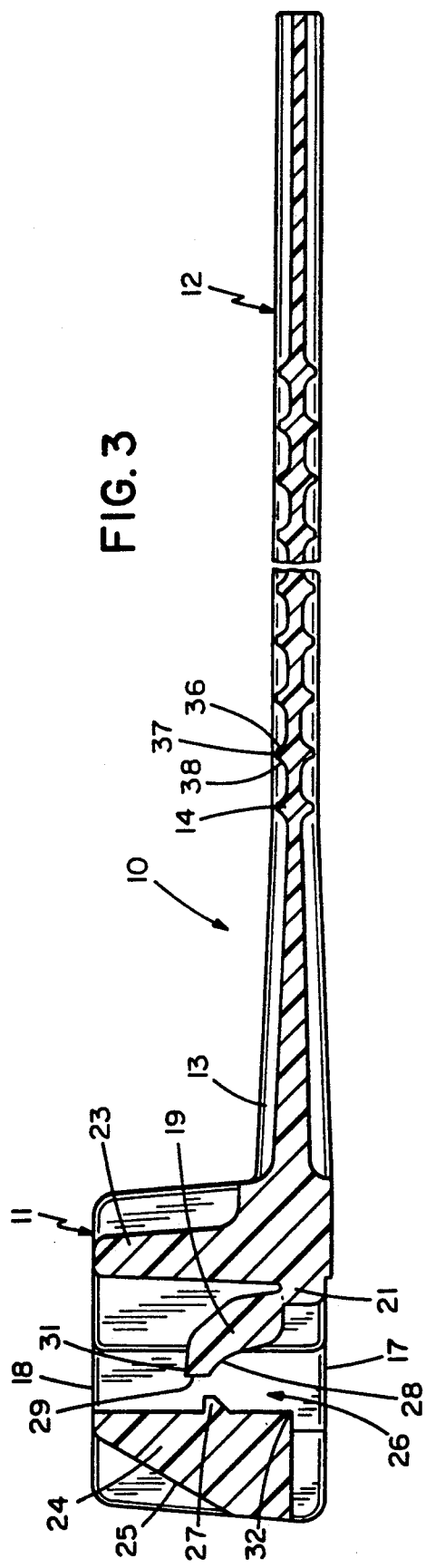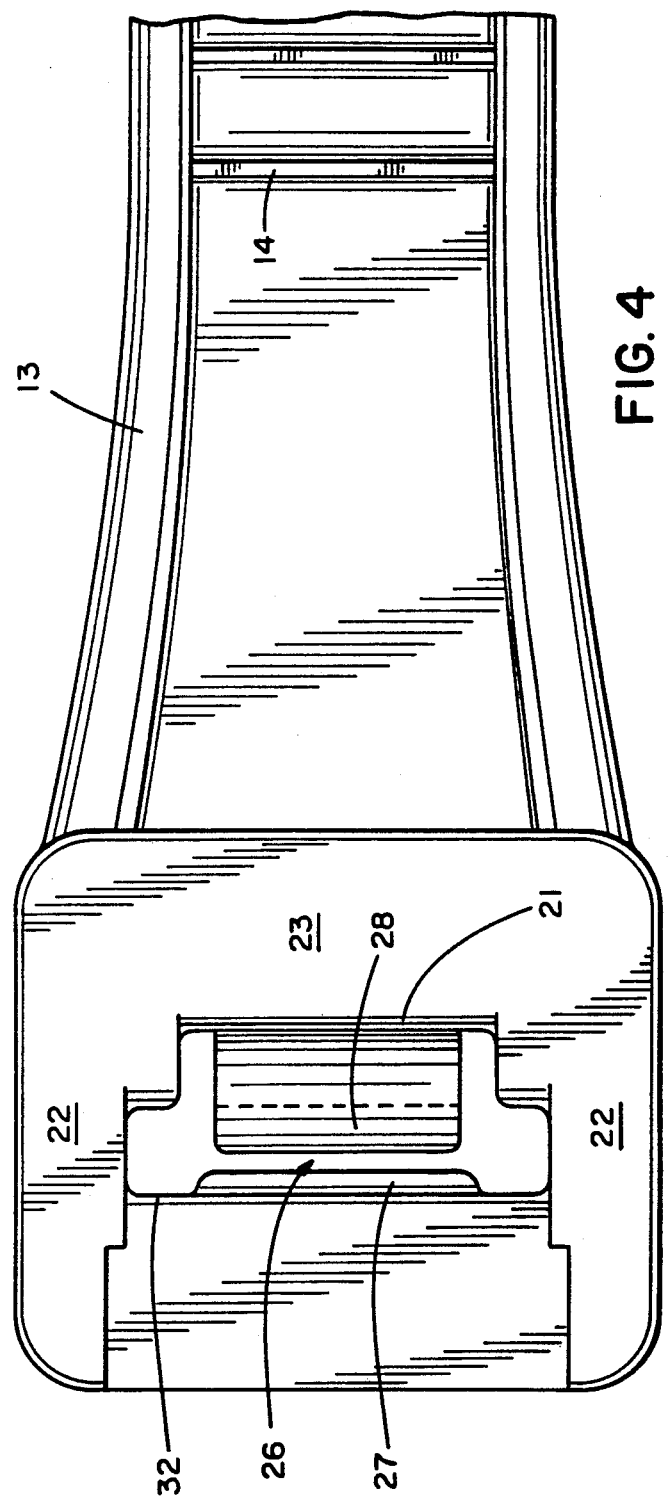

STRETCHED CABLE TIE

TECHNICAL FIELD

The present invention relates to a cable tie which is stretched from its as-molded condition to an elongated condition for use in bundling a plurality of electrical conductors or the like.

BACKGROUND OF THE PRIOR ART

Cable ties have been widely used for the bundling of electrical conductors. Such devices are typically formed by injection molding of a thermoplastic material to form a toothed strap having a head with an aperture therethrough for receipt of the toothed strap. A movable pawl within the head engages the toothed strap to prevent retrograde movement of the strap through the head. An example of such a cable tie is disclosed in Caveney et al. U.S. Pat. No. 3,965,538. As the length of the strap portion increases, so does the difficulty in molding such a product. In an effort to minimize the molding problems associated with long, thin parts, it has been proposed to mold a shorter strap section and stretch the section to its desired length which may be two and a half to three times the as-molded length. An example of such a cable tie is found in Paradis U.S. Pat. No. 4,754,529.

Stretching has been found to alleviate the problems associated with molding extremely long, thin parts, but the stretching process produces a new set of problems. The spacing of the strap teeth as molded is very accurate. However, once a tie has been stretched, it is very difficult to maintain uniformity of the distance between the strap teeth as a result of tolerances in the manufacturing process. Additionally, the as-molded profiles of the strap teeth will change during stretching. Furthermore, the stretching reorients the molecules which provides the desirable feature of increased strength for the same corresponding cross-section but the surface of the tie becomes very tough and promotes slippage of the strap teeth as compared to the as-molded condition.

When the commercial cable tie embodied in accordance with the disclosure of Paradis U.S. Pat. No. 4,754,529 is actually loaded under loads approaching the rated load, the teeth 22t-1 and 22t-2, as shown in FIG. 5C of the '529 patent, will disengage from the strap leaving only tooth 22t-3 on the pawl engaged with the strap. Upon applying a load to the '529 cable tie there is actually a point where the strap will undergo retrograde movement relative to the head and the strap tooth engaged with the fixed tooth 23t will disengage such that the fixed tooth 23t skips to the next strap tooth and actually changes the tension applied around a bundle. Such an event is undesirable when the cable tie is maintaining a bundle of wires or the like at a predetermined tension.

DISCLOSURE OF THE INVENTION

Accordingly, it is an object of the present invention to provide a stretched cable tie wherein there is no slippage of the strap relative to the pawl once a force has been applied to the strap to remove the strap from the head of the cable tie.

An additional object of the present invention is to provide a stretched cable tie wherein the pawl and strap engagement is independent of the varied spacing between the strap teeth. Another object of the present invention is to provide a fixed tooth opposite the pawl for engagement with strap teeth on the opposite side of the strap from the teeth positioned for engagement with the pawl. A further object of the present invention is to utilize other portions of the head to minimize the load that must be carried by the pawl. Yet an additional object of the present invention is to provide teeth on the strap with sufficient distance between the threading and locking surfaces so as to minimize distortion of the locking surfaces of the strap teeth during threading Yet another object of the present invention is to minimize shrinkage of the cable tie in those areas that provide withdrawal forces.

The above objects are accomplished by providing a stretched cable tie having a head connected to a strap having teeth on both sides of the strap. A movable pawl is positioned on a ledge inside the head and urges the strap into engagement with a fixed tooth within the head so that teeth on both sides of the strap are engaged by the pawl and fixed tooth respectively. A sharp corner is provided more than a multiple of the spacing between the strap teeth below the fixed tooth so as to allow the corner to penetrate the strap and engage the adjacent tooth to aid in providing a withdrawal force. A portion of the wall of the head behind the fixed tooth is removed to facilitate cooling and eliminate shrinkage in the area of the fixed tooth.

DETAILED DESCRIPTION OF THE DRAWINGS

Reference may be had to the drawings wherein FIG. 1 is an enlarged top view of a cable tie molded in accordance with the present invention.

FIG. 2 is a sectional view of the cable tie of FIG. 1 taken along lines 2—2.

FIG. 3 is the cable tie of FIG. 2 after stretching.

FIG. 4 is an enlarged bottom view of the cable tie shown in FIG. 3.

DETAILED DESCRIPTION OF THE PREFERRED EMBODIMENTS

Figure 5:
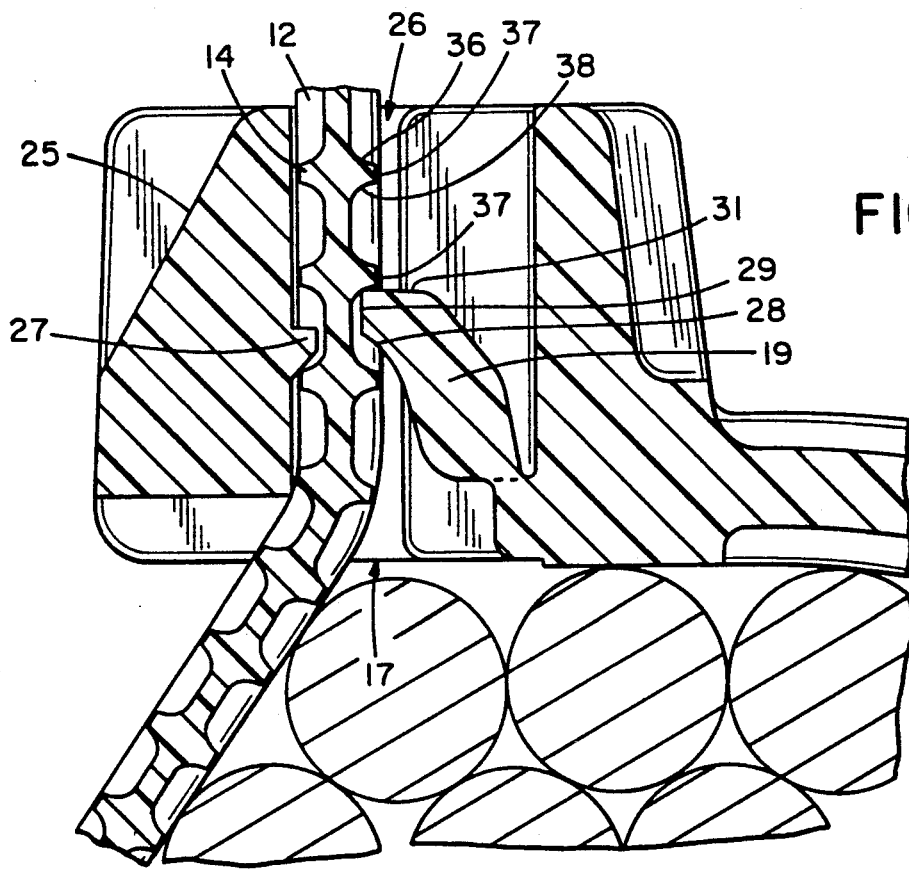
FIG. 5 is an enlarged partial sectional view of a cable tie after it has encircled a bundle and been subjected to a light load.

FIGS. 1 and 2 show a cable tie 10 as molded from a suitable polymeric thermoplastic material such as nylon. The cable tie 10 includes a head 11 and a strap 12. Strap 12 has a pair of side rails 13 extending longitudinally the length of the strap with a plurality of strap teeth 14 on each side of the strap 12 extending between the rails 13. At the other end of the cable tie from the head 11 a stretching projection 16 extends transversely of the strap 12 whereby the head 11 and stretching projection 16 may be engaged by fixtures to apply a desired separation force to stretch the cable tie from the condition as shown in FIGS. 1 and 2 to the condition as shown in FIG. 3.

It will be appreciated that while the strap 12 is elongated and its dimensions changed, the dimensions of the head 11 remain the same after stretching. The head 11 has an entry surface 17 where the strap 12 may be threaded through the head 11 and an exit surface 18 where the strap exits the head of the cable tie. A pawl 19 is positioned on a ledge 21 which is connected to a pair of spaced side walls 22. A rear wall 23 and an abutment wall 24 connect the side walls 22 and define a strap receiving aperture 26 therebetween. A fixed tooth 27 extends into the strap receiving aperture 26 from the abutment wall 24 having a tooth locking surface facing the exit face 18. The pawl 19 is provided with a single pawl tooth having a threading surface 28 facing the entry surface 17, a flat surface 29 substantially parallel to the abutment wall 24, and a tooth locking surface 31 extending transversely to the flat surface 29 and facing toward the exit surface 18. The surface of the abutment wall 24 behind the fixed tooth 27 is relieved as shown at 25 so as to minimize the material in back of the fixed tooth. This allows the fixed tooth 27 to be molded without producing shrinkage of the back wall 24 so as to affect the distance the fixed tooth 27 projects into the strap receiving aperture 26. As best shown in FIGS. 2 and 3, the bottom of the abutment wall 24 facing the entry surface 17 defines a sharp corner 32.

Referring now to FIG. 3, the cable tie is shown after it has been stretched. The stretching projection 16, shown in FIG. 2, has been cut off to show the cable tie in the condition in which the product is sold. The cable tie is shown without teeth at the end of the cable tie opposite the head 11 to facilitate threading of the end through the strap receiving aperture. However, teeth could be provided the entire length of the strap 12. Each of the strap teeth 14 has a threading surface 36, a substantially flat surface 37 and a locking surface 38. While the molded teeth 14 in FIG. 2 have a substantially trapezoidal configuration, once the strap is stretched the strap threading surface 3 and strap locking surface 38 become somewhat arcuate. The distance between the strap teeth, i.e., the distance from one point on a tooth to a corresponding point on the next tooth referred to as pitch, has been greatly increased as a result of stretching.

In a proposed embodiment, the overall length of the as-molded cable tie of FIG. 1 is approximately 13 inches and the stretched cable tie of FIG. 3 is 34 inches. The head has a height of 0.298 inches and a width of one half inch. The strap width is 0.454 inches as-molded and 0.310 inches after stretching. Such a tie uses less than 65 per cent of the material for a conventionally molded cable tie of the same length yet has greater strength.

As the strap 12 is threaded through the strap receiving aperture from entry face 17 toward exit face 18, the strap threading surfaces 36 will engage the pawl threading surface 28. There are forces applied to these surfaces since the pawl 19 must be moved away from fixed tooth 27 to permit passage of the strap. Any deformation of the pawl tooth during threading will occur at the juncture between flat surface 29 and pawl threading surface 28. Similarly, the strap teeth 14 during threading are engaged by the pawl on the threading surface 36 at the juncture with strap flat surface 37.

Referring now to FIG. 5, the strap 12 has been inserted through the strap receiving aperture 26 and a small load has been placed on the strap tending to pull the strap out of the head toward the entry surface 17. The pawl tooth locking surface 31 is shown engaged with one of the strap locking surfaces 38. The pawl engages the strap locking surface 38 at the juncture of flat surface 29 and the tooth locking surface 31 which is different from the point of force during threading so there would be no deformation of the tooth locking surface 31 at the point of locking as a result of deformation during threading. Similarly, any deformation of the strap tooth at the juncture of threading surface 36 and flat surface 37 during threading will not affect the locking which takes place at the juncture of strap flat surface 37 and strap locking surface 38. It is desirable to maintain a sufficient dimension for the pawl flat surface 29 and the strap flat surface 37 to insure that there is no deformation of the corresponding pawl and strap tooth at the point of locking.

The pawl threading surface 28 is arcuate so as to provide relief to enable the pawl to rotate into engagement with the next strap tooth. It will be appreciated that if the pawl threading surface 28 engaged a tooth 14, it would be possible to keep the pawl tooth locking surface 31 from obtaining sufficient engagement of the strap locking surface 38.

The locking surface of the fixed tooth 27 is spaced a distance toward the entry face 17 from the pawl tooth locking surface 31 and is across the strap passageway 26 from the pawl tooth flat surface 29. When additional force in the direction of entry face 17 is applied to the strap, as shown from FIG. 5 to FIG. 6, the pawl tooth locking surface 31 becomes angled as the pawl 19 moves toward the abutment wall 24 at which time the fixed tooth 27 comes into engagement with a strap tooth 14 on the opposite side of the strap from the pawl 19. At this time, there is also some elastic deformation of the strap tooth 14 and the tooth locking surface 31.

Typically, stretched straps of the present invention are used for large bundles. Accordingly, as the cable tie is fastened around the bundle and tightened, the strap 12 passing through the entry face 17 tends to come into the entry face from a direction approaching a parallel position to the entry face 17. As the load is increased, the sharp corner 32 penetrates the side rails 13 of the strap and engages a strap tooth 14. The sharp corner 32 is defined by perpendicular surfaces of the abutment wall 24. It would be possible to change the angle of the surfaces of the abutment wall 24 to greater than 90 degrees and still maintain a desired sharp corner. In the preferred embodiment a 0.005 inch radius is provided at the corner and testing has established a 0.015 inch radius is undesirable. By spacing the sharp corner 32 more than a multiple of the distance between the strap teeth 14, it will be ensured that a strap tooth 14 will engage the corner as additional force is applied.

When the load on the strap is increased to cause the corner 32 to pierce the rail 13, there are forces on the strap at three places. There is force at the intersection between the pawl tooth locking surface 31 and a strap locking surface 38. There is also force where the fixed tooth 27 engages a strap locking surface 38 and finally, there is force where the sharp corner 32 of the abutment wall 24 pierces the rails 13 and engages a strap locking surface 38. In prior art unstretched cable ties it was desirable to have multiple toothed pawls to distribute the withdrawal load. The present invention provides a distribution of the withdrawal load using only a single toothed pawl thereby avoiding problems with varying strap tooth pitch. Additionally, use of a single pawl tooth minimizes problems associated with matching multiple pawl teeth with strap teeth having different pitch as a result of stretching.

As best shown in FIG. 4, the sharp corner 32 extends substantially between side walls 22. If desired, the sharp corner 32 could be coextensive with the width of fixed tooth 27 which does not extend all the way between the side walls 22 and relieved at the juncture with the side walls 22 whereby there could be no penetration of the side rails 13 but still engagement with the strap locking surface 38. Penetration of the side rails 13 by the corner 32 does not appreciably weaken the cable tie because the area of the strap going around the corner 32 that is penetrated is in compression. In the instant invention, extension of the sharp corner 32 to join the side walls 22 also provides a frictional force against the side rails 13 upon applying a withdrawal force to the strap. This frictional force slows retrograde movement of the strap sufficiently to give the pawl 19 time to move into engagement with the strap tooth 14 immediately above the pawl when the retrograde movement begins. Quick return movement of the pawl 19 from a threading position to a locking position is enhanced by mounting the pawl directly on the ledge 21. Once the pawl tooth locking surface 31 engages a strap locking surface 38 it will remain in engagement as additional force is applied to withdraw the strap. The additional force also causes the pawl 19 to rotate counterclockwise as shown from FIG. 5 to FIG. 6 wherein additional force is applied against the strap to maintain a strap tooth 14 in position to be retained by the fixed tooth 27.

Figure 6:
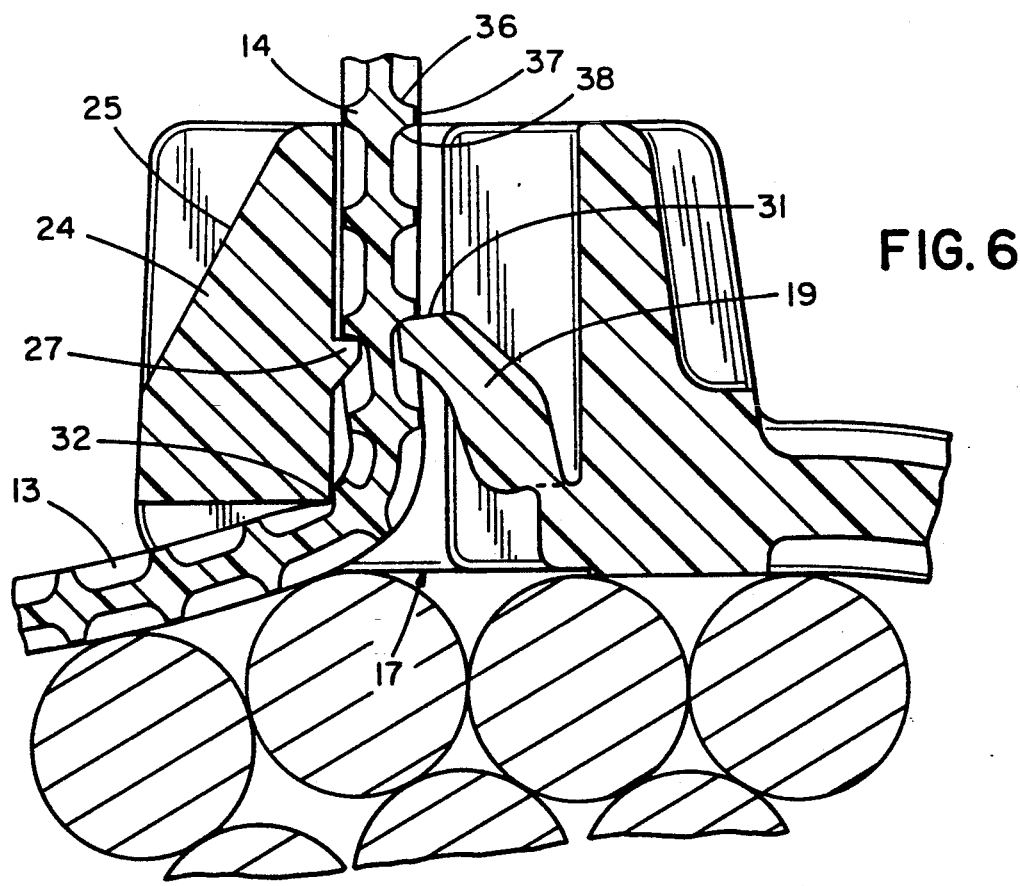
FIG. 6 is an enlarged partial sectional view similar to FIG. 5 showing the effects of a medium load.
Figure 7:
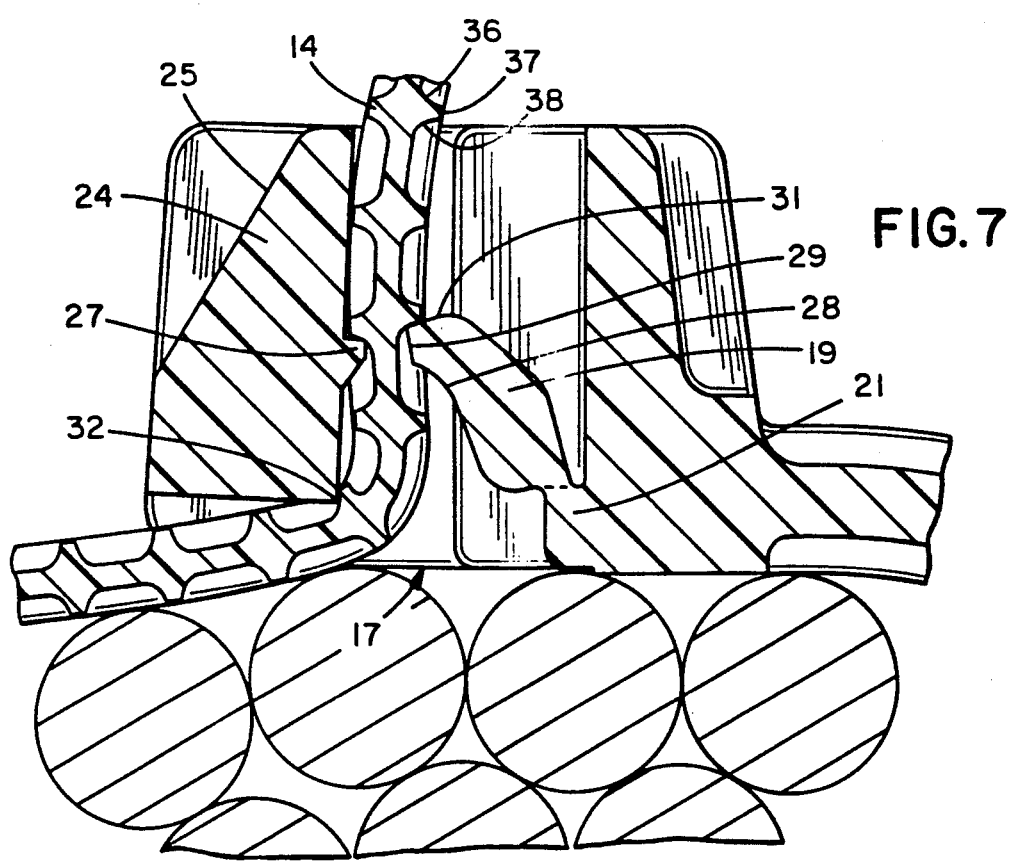
FIG. 7 is an enlarged partial sectional view similar to FIG. 5 showing the effects of a medium heavy load.
Figure 8:
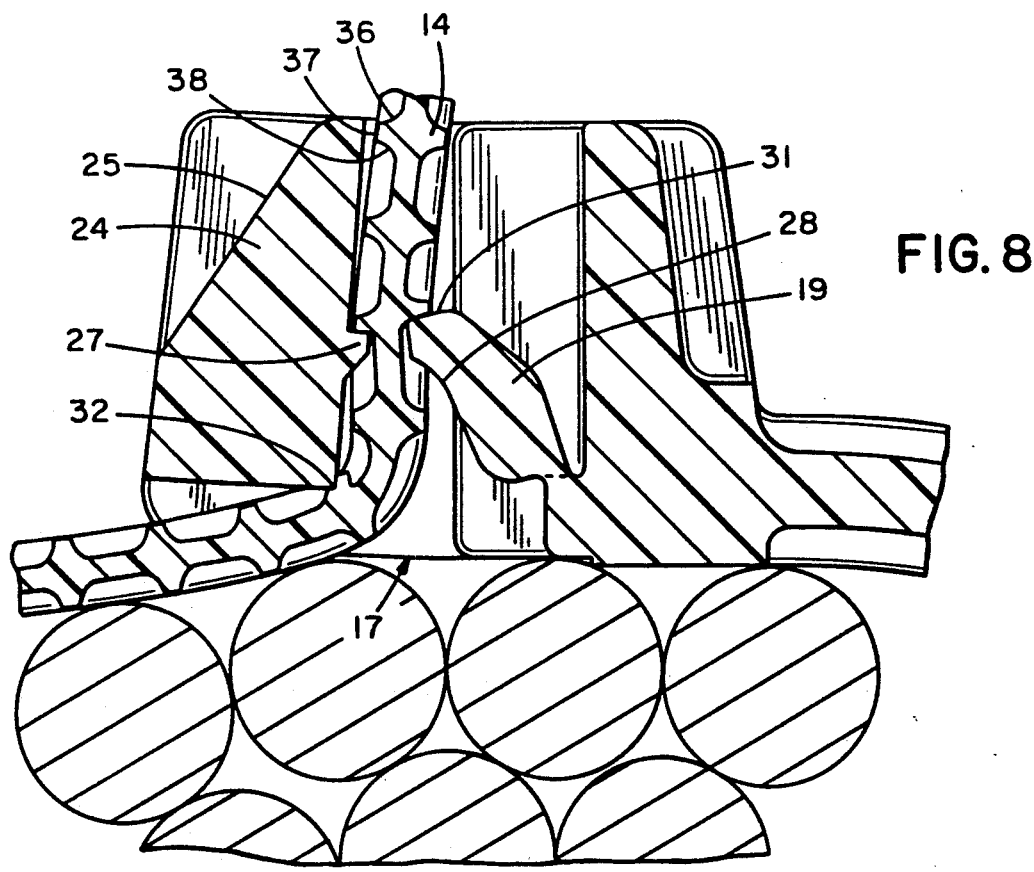
FIG. 8 is an enlarged partial sectional view similar to FIG. 5 showing the effects of a heavy load.

Referring now to FIGS. 7 and 8, the cable tie is shown under progressively increased loads from the loads of FIGS. 5 and 6. There remain three places where substantial forces are applied to prevent withdrawal of the strap, namely, the engagement of the pawl tooth locking surface 31 with the strap locking surface 38, engagement of the fixed tooth 27 with a strap locking surface 38, penetration of the sharp corner 32 into the side rails 13 and engagement with a strap locking surface 38. There is additional deformation under the heavy load of FIG. 8. Under the load shown in FIG. 8 the head itself begins to deform as can be seen in that the exit surface 18 no longer lies in a plane.

Figure 9:
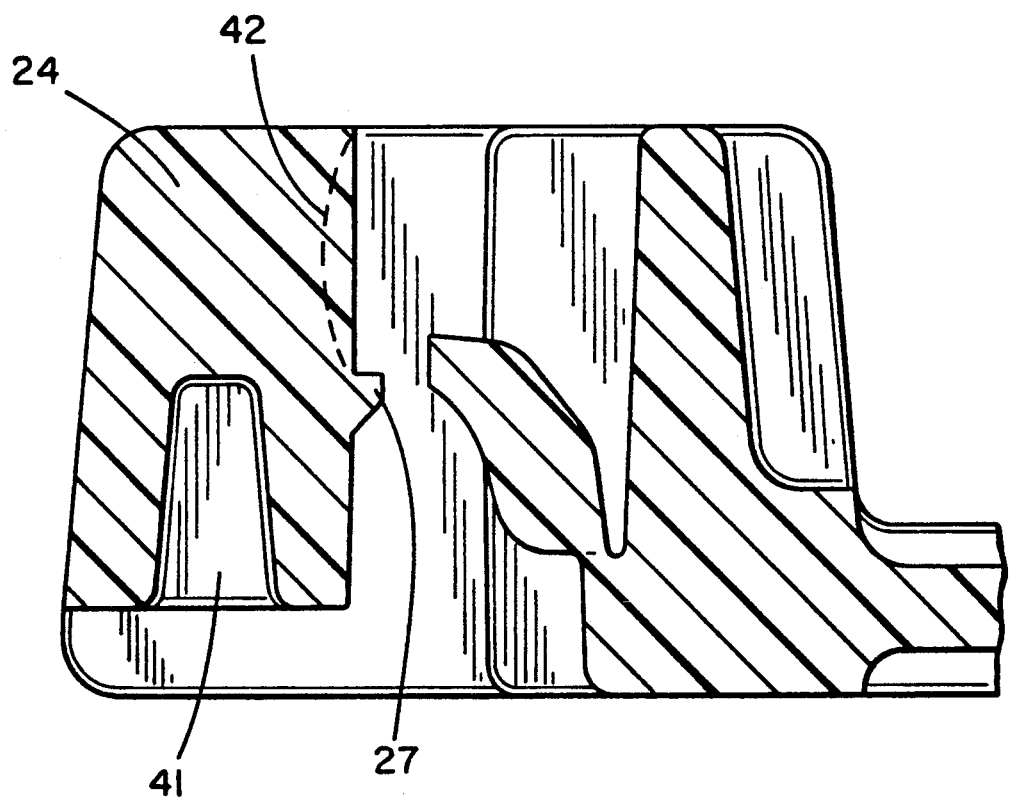
FIG. 9 is an enlarged sectional view of the head of a cable tie showing an alternate embodiment.

An alternative embodiment is disclosed in FIG. 9 where rather than having the relieved portion of the abutment wall shown at 25 in FIGS. 1, 3 and 5-8, a relief 41 is molded into the abutment wall 24 and extends from the bottom of the abutment wall to a position substantially level with the locking surface of the fixed tooth 27. This relief 41 would extend the width of at least the fixed tooth 27 as shown in FIG. 4. Such a structure will allow for no shrinkage of the plastic in the area of the fixed tooth. If the part were molded as shown in FIG. 9 without the relief shown in the abutment wall at 25 in FIGS. 1, 3 and 5-8, it is possible that some shrinkage could occur in the area shown by the dotted line 42 in FIG. 9. Such shrinkage would not affect the distance the fixed tooth 27 projects into the strap passageway 26 and have no affect on performance.

We claim:

1. A stretched cable tie comprising a head and a strap having a plurality of teeth on both sides of said strap;
    said strap having been stretched from its as-molded condition to lengthen both said strap and the as-molded spacing between said teeth;
    said head having an abutment wall connected to a pair of spaced side walls having an entry face and an exit face with a strap receiving aperture extending therebetween;
    said abutment wall having a fixed tooth extending into said strap receiving aperture intermediate the entry and exit faces, said fixed tooth having a locking surface facing toward said exit face; and
    a pawl mounted for movement in said head having a single pawl tooth extending into said strap receiving aperture, said tooth being adapted to engage one of said teeth when said strap is positioned through said strap receiving aperture and a force is applied in a direction toward said strap entry face to a portion of said strap within said head.

2. The cable tie of claim 1 wherein a ledge extends between said side walls spaced across said strap receiving aperture from said abutment wall and said pawl is mounted directly on said ledge.

3. The cable tie of claim 1 wherein said pawl tooth has a threading surface facing toward the entry face, a flat surface substantially parallel to the abutment wall, and a tooth locking surface transverse to said flat surface facing toward the exit face.

4. The cable tie of claim 1 wherein said threading surface is arcuate so as to minimize the possibility for interference between said pawl and said strap teeth other than the engaged one of said teeth.

5. The cable tie of claim 3 wherein said fixed abutment is spaced toward said entry surface from said tooth locking surface.

6. The cable tie of claim 5 wherein the locking surface on said fixed tooth is across said strap passageway from the flat surface of said pawl tooth.

7. The cable tie of claim 1 wherein said abutment wall has a sharp corner adjacent said entry face.

8. The cable tie of claim 7 wherein said pawl tooth has a tooth locking surface facing toward said exit face wherein the distance from the tooth locking surface to the sharp corner is more than a multiple of the distance between said teeth on said strap so that said corner is positioned to engage one of the strap teeth that is positioned between said corner and said tooth locking surface.

9. The cable tie of claim 8 wherein said distance is slightly greater than twice the distance between said strap teeth.

10. The cable tie of claim 1 wherein each of said strap teeth has a threading surface, a locking surface and an intermediate surface connecting said threading and locking surfaces.

11. The cable tie of claim 10 wherein said intermediate surface has sufficient flat length prior to stretching so that a portion thereof remains substantially flat after stretching.

12. The cable tie of claim 1 wherein said abutment wall is relieved so as to permit cooling of said head after molding without shrinkage in the area of said fixed tooth.

13. A stretched cable tie having a head and a strap with a plurality of teeth on each side of said strap;
    said strap having been stretched from its as-molded condition to lengthen both said strap and the as-molded spacing between said teeth;
    said head having a pair of spaced side walls joined by an abutment wall;
    said head further having a strap entry face and strap exit face with a strap receiving aperture extending therebetween;
    a fixed tooth extending from said abutment wall into said strap receiving aperture, said fixed tooth having a locking surface facing toward said exit face;
    said abutment wall having a sharp corner positioned more than a multiple of the distance between said strap teeth toward said entry face from said fixed tooth;

a pawl mounted for movement in said head having at least one pawl tooth extending into said strap receiving aperture, said tooth being adapted to engage one of said teeth when said strap is positioned through said strap receiving aperture and a force is applied in a direction toward said strap entry face to a portion of said strap within said head.

14. The cable tie of claim 13 wherein said distance is slightly greater than twice the distance between said strap teeth.

15. The cable tie of claim 13 wherein said strap has a pair of spaced rails extending longitudinally with said teeth extending therebetween, said corner being adapted to penetrate said rails when said force is increased and engage a tooth on said strap.

16. The cable tie of claim 15 wherein a ledge extends between said side walls spaced across said strap receiving aperture from said abutment wall and said pawl is mounted directly on said ledge.

17. The cable tie of claim 16 wherein said pawl tooth has a threading surface facing toward the entry face, a flat surface substantially parallel to the abutment wall, and a tooth locking surface transverse to said flat surface facing toward the exit face.

18. The cable tie of claim 17 wherein said fixed abutment is spaced toward said entry surface from said tooth locking surface.

19. The cable tie of claim 18 wherein the locking surface on said fixed tooth is across said strap passageway from said tooth flat surface.

20. The cable tie of claim 19 wherein each of said strap teeth has a threading surface, a locking surface and an intermediate surface connecting said threading and locking surfaces.

21. The cable tie of claim 20 wherein said intermediate surface has sufficient length prior to stretching so that a portion thereof remains substantially flat after stretching.

22. The cable tie of claim 21 wherein said abutment wall is relieved so as to permit cooling of said head without shrinkage in the area of said fixed tooth.

23. A stretched cable tie comprising a head and a strap extending therefrom having a plurality of strap teeth on both sides of said strap;

said strap having been stretched from its as-molded condition to lengthen both said strap and the as-molded spacing between said teeth;

said head having an abutment wall connected to a pair of spaced side walls having an entry face and an exit face with a strap receiving aperture extending therebetween;

said abutment wall having a fixed tooth extending into said strap receiving aperture intermediate the entry and exit faces, said fixed tooth having a locking surface facing toward said exit face;

a pawl mounted for movement in said head across the strap receiving aperture from said fixed tooth, said pawl having at least one pawl tooth extending into said strap receiving aperture, said tooth being adapted to engage one of said teeth when said strap is positioned through said strap receiving aperture and a force is applied in a direction toward said strap entry face to a portion of said strap within said head; and a portion of the abutment wall being relieved so as to permit cooling of said head without shrinkage in the area of said fixed tooth.

* * * * *

UNITED STATES PATENT AND TRADEMARK OFFICE
CERTIFICATE OF CORRECTION

PATENT NO. : 5,146,654
DATED : September 15, 1992
INVENTOR(S) : Caveney et al.

It is certified that error appears in the above-identified patent and that said Letters Patent is hereby corrected as shown below:

Column 3, line 36, change "3" to --36--.

Column 6, line 19, change "1" to --3--.

Signed and Sealed this

Thirtieth Day of November, 1993

Attest:

BRUCE LEHMAN

Attesting Officer

Commissioner of Patents and Trademarks